Patented May 16, 1933

1,909,789

UNITED STATES PATENT OFFICE

OSKAR PANTKE, OF COLLEGE POINT, NEW YORK, ASSIGNOR, BY MESNE ASSIGNMENTS, TO CATALIN CORPORATION OF AMERICA, OF FORDS, NEW JERSEY, A CORPORATION OF DELAWARE

SYNTHETIC RESIN RESEMBLING NATURAL MARBLE AND PROCESS OF MAKING SAME

No Drawing.   Application filed August 28, 1930. Serial No. 478,546.

This invention relates to imitation marble and more particularly to imitation marble constituted of a phenol-formaldehyde condensation product and to a process of making said imitation marble.

Heretofore many attempts have been made to replace natural marble with imitation or synthetic products which resemble marble but which are inexpensive and which are capable of being fabricated into articles of commerce. As is well known, marble is relatively expensive, is heavy, and is difficult to machine or work. For many uses the hardness, difficulty of machining and the expense renders it practically unavailable for commercial use. Various proposals have been made to produce an artificial product which could be used to better advantage in the place of marble. None of these proposals, as far as I am aware, has been satisfactory and practical when carried into commercial operation.

I have discovered an imitation or synthetic marble which is free from the short comings of prior artificial products and which resembles white marble.

A further object of the invention is to provide an imitation white marble constituted of a phenol-formaldehyde condensation product which is relatively strong, which can be worked and machined readily into various articles, which is relatively light as compared to heavy natural marble which is relatively non-brittle and which has many desirable properties.

A further object of the invention is to provide a practical process for producing an imitation marble having the aforesaid characteristics and which can be conducted on an industrial scale in a satisfactory and economical manner.

Other objects and advantages of the invention will become apparent from the following description.

For a better understanding of the invention, the following specific examples will be given for illustrative purposes.

Example I

About 1 part of U. S. P. phenol is mixed with about 2 parts 40% U. S. P. aqueous formaldehyde solution. A relatively strong fixed alkaline catalyst such as C. P. sodium hydroxide is added to the phenol-formaldehyde mixture to the extent of about 0.033 parts. This mixture is heated for a period extending to about 2 to 3, 3½ or 4 hrs. at a temperature substantially below the boiling point of water (100° C.) and preferably lying within a range of 60° to 75° C. or 80° C.

After the termination of the aforesaid heating period a vacuum of about 730 millimeters is applied to the resinous mass. The temperature of the resinous mass falls to about 35° C. to 40° C. and this fall in temperature is compensated by the addition of heat preferably in the form of indirect steam heat. The application of heat and vacuum is continued until the temperature returns to the original temperature lying within the range between 60° to 75° C. or 80° C.

After the termination of the aforesaid operations about 0.075 parts of C. P. lactic acid is added to neutralize the caustic soda. Heating is continued in the presence of a vacuum as aforesaid to effect dehydration of the resinous mass. A very convenient test for dehydration is to take a small amount of resin and drop it into a beaker of water at about 11° C. to about 13° C. say about 12° C. If the resin sets to a globule or ball which yields slightly when pressed between the first finger and thumb then the resin is finished.

Upon dehydration of the resinous mass the latter can be cast into open molds for curing or vulcanizing. The latter operation is preferably conducted in a heated chamber which is maintained at a temperature below the boiling point of water (100° C.), preferably a temperature of about 76° C. to about 82° C.

This vulcanization is continued until the resinous mass sets or hardens. Usually about 150 to about 200 hours are sufficient for practically complete hardening of the resinous mass. Upon the expiration of this period, a resin is produced having a white color which closely resembles the color of marble.

*Example II*

In the present instance, the same process as described in connection with Example I is followed except that the proportions and reacting materials are as follows:

| | Parts |
|---|---|
| U. S. P. phenol | 1.0 |
| U. S. P. 30% aqueous formaldehyde solution | 2.5 |
| C. P. potassium hydroxide | 0.035 |
| C. P. lactic acid | 0.068 |

The imitation marble produced in the foregoing manner has the following properties:

Specific gravity, 1.310 (approximately).
Ash, 0.35% (approximately).
Tensile strength, 6000 lbs. per sq. in. (approximately).
Compressive strength, 10000 to 12000 lbs. per sq. in. (approximately).
Rockwell hardness, B—70 B—75 (approximately).

The specific gravity of the resin may be varied as those skilled in the art will readily understand. For example, the greater the water content, the lower the specific gravity and conversely, the lower the water content, the higher the specific gravity. By varying the water content, resins may be produced having a lower and a higher specific gravity than the figures set forth hereinabove. Furthermore, by varying the degree of heat used in the vulcanization the specific gravity of the resin may likewise be varied.

The ash content of the resin is preferably maintained as low as possible and is usually dependent upon the purity of the chemicals employed.

The strength of the resin may be varied within relatively wide limits. Generally speaking, by over-vulcanizing or under-vulcanizing the strength is lowered and by vulcanizing carefully the strength may be increased. By taking care to have the resin free from imperfections, air bubbles and blow holes, a stronger resin may be produced. Furthermore, the more solids including fillers and the like when incorporated in the resin tends to decrease the strength of the resin.

The hardness of the resin may be varied by the curing or vulcanizing operation and/or the extent to which the resin has polymerized. It may be broadly stated that the more complete the polymerization or vulcanization, the harder the resin.

The resin is fire retardent and is inert to certain oils and reagents. Furthermore, the resin is relatively elastic and is relatively non-brittle and can be worked and fabricated by the use of the methods usually employed when working with wood or the like.

In case it is desired to mottle the white marble with black or other colored streaks or the like so as to resemble natural marbles of this type, a small portion of fluid resin containing an appropriate dye or coloring material can be mixed in mass of resin preferably just prior to pouring into molds. For instance, a portion of liquid resin can be taken and tinted or dyed with varnish black and/or nigrosine. This tinted or dyed portion of resin can then be added and mixed in the resin preferably just prior to pouring into molds. The finished resin will then contain black streaks and the like resembling natural marble.

It will be noted that the present invention provides a low temperature process for the production of artificial white marble constituted of a phenol-formaldehyde condensation type of resin made at relatively low temperatures. By low temperatures is meant temperatures lower than 100° C. which is in sharp contrast to prior processes which must be conducted at or above the boiling point of water or 100° C. at atmospheric pressure. Generally speaking, the lower the temperature employed in the present process the longer the time it takes to produce the resin. For instance, if a temperature of about 50° C. were employed then a longer time would be necessary to heat the mass than has been described in connection with the temperature given. If a higher temperature is used than the one specified, then heating period would be shortened but the resin would have a tendency to become darkened. By the present process a resin is produced which has a marblish color resembling natural marble.

It will be also observed that my invention provides an improved phenol-formaldehyde resin simulating marble which is capable of easy fabrication. For instance, a rod of the present resin can be turned on a lathe and the cut material is turned off in the form of a long ribbon quite similar to a wood shaving. Prior resins do not generally have this property and tend to cut off in small chips or pieces when turned on a lathe. The instant characteristic is very useful in identifying the improved resin set forth herein. Another good test for identifying the present resin is to subject a rod of the resin to an impact blow, as for instance, when a rod of resin is grasped in the hand and the free end of the rod is struck against a fixed object. With resins of the present type, they will absorb considerable shock whereas other resins of the same class will break or fracture. Then again if a rod of suitable dimensions of the instant resin is dropped on its end on either a concrete or hard floor it will bounce back without breaking. Other known resins are rather dead and do not bounce very much and generally have a tendency to crack when dropped. Furthermore, a small rod constituted of the present resin say ½" in diameter, when immersed in hot water can be bent quite readily without breaking. Other resins are less flexible and will tend to break when subjected to this test.

It is further to be noted that the present process produces a marble resin which is tougher and stronger than known resins. For instance, the present resin generally has a higher tensile strength and elasticity than similar resins. In addition, the instant resin is less brittle than prior resins. In fact, my resin is relatively non-brittle as compared with old resins of the type described herein, particularly in regard to workability, and in the claims the phrase "relatively non-brittle" will be used to characterize this distinguishing feature of my synthetic ivory resin.

Moreover, the present process produces a phenol-formaldehyde resin which when in its liquid state prior to hardening has a hydrogen ion content corresponding to a pH value of about 6.00 as determined by a potentiometer of the Leeds and Northrup type. Prior low temperature resins have different pH values and the aforesaid pH value in liquid state for liquid marble resin made in accordance with the process described herein is another good way of identifying the present improved resin.

It is to be observed that the present invention provides a process for producing a low temperature phenol-formaldehyde synthetic resin made by reacting phenol and formaldehyde in the proportion of about 1 part by weight of the former to about 0.8 parts by weight of the latter. The amount of formaldehyde used depends upon the final product and the form of raw material. In other words, when formaldehyde is used as a 30% or as a 40% aqueous formaldehyde solution, about 2.5 parts of the former and about 2.0 parts of the latter are used. The phenol-formaldehyde mass contains a fixed alkali catalyst which is present to an extent of about 0.033 to 0.035 parts by weight. Of course, when the fixed alkali catalyst, such as caustic soda or caustic potash, is used in the form of a solution an increased amount of solution will have to be used depending upon the dilution or concentration of the solution as those skilled in the art will readily understand. Subsequently, the fixed alkali catalyst is at least neutralized by the addition of about 0.068 to about 0.075 parts by weight of lactic acid. If the acid is used in the form of a solution, the amount must be increased depending upon the dilution or concentration of the solution. Variations and modifications of the specific proportions herein given are within the purview of the present specification and claims as those skilled in the art will understand.

It is to be noted that the present resin is distinctly different from the resin produced by the processes described in my co-pending applications Serial Numbers 478,543; 478,544; and 478,545. In the first application a translucent resin is produced; in the second application a clear transparent resin is described; and in the third application an opaque ivory resin resembling natural ivory. In contrast to these resins, the process described in the present application produces a white opaque resin resembling natural marble. This resin can be mottled with various colors to represent various natural marbles. Of course, the opaqueness of the resin may be varied by carrying the dehydration to various degrees. In other words during the production of the resin, the evaporation of the water from the resinous mass is effected by the use of a low temperature substantially under 100° C. and the application of a vacuum. By continuing the application of this low heat and vacuum for various periods, the depth of the opaqueness may be varied.

Although I have set forth herein specific temperatures, concentrations, periods of time, specific substances and specific operations, it will be observed that the use of equivalents and variations may be resorted to without departing from the spirit and scope of the invention as defined in the appended claims.

I claim:—

1. The process of producing imitation marble which comprises mixing phenol and aqueous formaldehyde in the proportion of about 1 part by weight of phenol to about 2 to 2.5 parts by weight of aqueous formaldehyde of about 30% to about 40% strength, adding about 0.033 to about 0.035 parts by weight of a c. p. fixed alkali catalyst, heating said mixture without boiling the same at a temperature of about 60° C. to about 80° C. for a period of about 2 to about 4 hours to cause a reaction and formation of a resinous mass under non-reflux conditions, applying a vacuum to effect evaporation of water from said mass, continuing the application of heat to maintain the aforesaid temperature of said mass, adding about 0.068 parts to about 0.075 parts by weight of c. p. lactic acid, continuing the application of said vacuum and low heat to effect dehydration of the resinous mass, discontinuing said operation when a sample of the resinous mass upon being dropped in water having a temperature of about 11° C. to about 13° C. congeals to a globule having just sufficient hardness to yield slightly when squeezed between the fingers, then pouring the resinous mass into molds, and subjecting said molds to low heat at a temperature of about 82° C. or below for a period up to about 200 hours to harden and solidify the said resinous mass into a mass resembling imitation marble.

2. The process of producing imitation marble which comprises mixing phenol and 40% U. S. P. aqueous formaldehyde in the proportion of about 1 part by weight of phenol to about 2 parts by weight of 40% aqueous formaldehyde, adding about 0.033 parts by weight of c. p. sodium hydroxide, heating said mixture without boiling the same at a temperature of about 60° C. to about 80° C. for a period of 2 to about 4 hours to cause reaction of the aforesaid mixture and the formation of a resinous mass under non-reflux conditions, applying a vacuum to effect evaporation of water from said mass, the said evaporation causing the temperature of the mass to fall, continuing the application of said vacuum and said heat until the temperature of said mass raises to a temperature of about 60° C. to about 80° C., adding about 0.068 to about 0.075 parts by weight of lactic acid to the resinous mass, continuing the application of said vacuum and said low heat until a sample of the resinous mass congeals when dropped in cold water having a temperature of about 11° C. to about 13° C. to a globule having just sufficient hardness to yield slightly when squeezed between the fingers, then pouring the resinous mass into molds, and subjecting said molds to low heat at a temperature of about 76° C. to about 82° C. for a period up to about 200 hours to harden and solidify the said resinous mass into a mass resembling marble.

3. An imitation marble constituted of a low temperature phenol-formaldehyde resin made by mixing phenol and aqueous formaldehyde in the proportion of about 1 part by weight of phenol to about 2 parts of 40% to 2.5 parts of 30% by weight of aqueous formaldehyde, adding about 0.033 to 0.035 parts by weight of a c. p. fixed alkali hydroxide, heating said mixture without boiling the same at a temperature of about 60° C. to about 80° C. for a period of about 2 to about 4 hours to cause a reaction and formation of a resinous mass under non-reflux conditions, applying a vacuum to effect evaporation of water from said mass, continuing the application of heat to maintain the aforesaid temperature of said mass, adding about 0.068 parts by weight to about 0.075 parts by weight of c. p. lactic acid, continuing the application of said vacuum and low heat to effect dehydration of the resinous mass, discontinuing said operation when a sample of the resinous mass upon being dropped in water having a temperature of about 11° C. to about 13° C. congeals to a globule having just sufficient hardness to yield slightly when squeezed between the fingers, then pouring the resinous mass into molds, and subjecting said molds to a low heat at a temperature of about 82° C. or below for a period up to about 200 hours to harden and solidify the said resinous mass into a mass resembling imitation marble.

4. An imitation marble constituted of a low temperature phenol-formaldehyde resin made by mixing c. p. phenol and 40% c. p. aqueous formaldehyde in the proportion of about 1 part by weight of phenol to about 2 parts by weight of aqueous formaldehyde, adding about 0.033 parts by weight of c. p. sodium hydroxide, heating said mixture without boiling the same at a temperature of about 60° C. to about 80° C. for a period of 2 to about 4 hours to cause reaction of the aforesaid mixture and the formation of a resinous mass under non-reflux conditions, applying a vacuum to effect evaporation of water from said mass, the said evaporation causing the temperature of the mass to fall, continuing the application of said vacuum and said heat until the temperature of said mass rises to a temperature of about 60° C. to about 80° C., adding about 0.075 parts by weight of c. p. lactic acid to the resinous mass, continuing the application of said vacuum and said low heat until a sample of the resinous mass congeals when dropped in cold water having a temperature of about 11° C. to about 13° C. to a globule having just sufficient hardness to yield slightly when squeezed between the fingers, then pouring the resinous mass into molds, and subjecting said molds to low heat at a temperature of about 76° C. to about 82° C. for a period up to about 200 hours to harden and solidify the said resinous mass into a mass resembling marble.

5. The process of producing a low temperature phenol-formaldehyde resin resembling natural marble which comprises reacting phenol with formaldehyde in the presence of a fixed alkali hydroxide, heating said mass without boiling the same at a temperature substantially under 100° C. under non-reflux conditions to form a resinous mass, applying a vacuum to effect the evaporation of water, the temperature of the mass tending to fall, continuing the application of heat to raise the temperature of said mass to a temperature substantially under 100° C., adding c. p. lactic acid to substantially neutralize said alkali catalyst, continuing the application of said heat substantially below 100° C. and said vacuum to effect dehydration of the resinous mass, pouring the resinous mass into molds and subjecting said molds to heat at a temperature substantially below 100° C. to harden and solidify the said resinous mass.

6. The process of producing a low temperature phenol-formaldehyde resin resembling natural marble which comprises reacting phenol and a substance yielding formaldehyde in the proportion of about 1.00 parts by weight of phenol to about 0.8 parts by weight of formaldehyde in the presence of a fixed alkali catalyst, heating the said phenol-formaldehyde mass without boiling the same at a low heat substantially under 100° C. for a period of about 2 to about 4 hours under non-reflux conditions to form a resinous mass, applying a vacuum to said resinous mass whereby water is evaporated and the temperature of the resinous mass tends to fall, continuing heating said resinous mass substantially under 100° C. to counteract the tendency of the temperature to fall, adding c. p. lactic acid to substantially neutralize the alkali catalyst, continuing the application of said vacuum and said heat, pouring said mass into molds, and subjecting the mass in said molds to a low heat at a temperature substantially under about 100° C. to harden said resinous mass.

7. The process of producing a low temperature phenol-formaldehyde resin resembling natural marble which comprises reacting phenol and a substance yielding formaldehyde in the proportion of about 1.00 part by weight of phenol to about 0.8 parts by weight of formaldehyde in the presence of a fixed alkali catalyst, heating the said phenol-formaldehyde mass without boiling the same at a low heat substantially under 100° C. under non-reflux conditions to form a resinous mass, applying a vacuum to said resinous mass whereby water is evaporated and the temperature of the resinous mass tends to fall, continuing heating said resinous mass substantially under 100° C. to counteract the tendency of the temperature to fall, adding sufficient c. p. lactic acid to neutralize the alkali catalyst, continuing the application of said heat and said vacuum to effect dehydration of said mass, pouring said resinous mass into molds, and subjecting the mass in said molds to a low heat at a temperature substantially under about 100° C. to harden said resinous mass.

8. The process of producing a low temperature phenol-formaldehyde resin resembling natural marble which comprises reacting a mass of phenol and a substance yielding formaldehyde in the presence of a fixed alkali catalyst, heating the said phenol-formaldehyde mass without boiling the same at low heat substantially under 100° C. for a period of about 2 to about 4 hours under non-reflux conditions to form a resinous mass, applying a vacuum to the said mass whereby water is evaporated and the temperature of mass tends to fall, continuing heating said mass substantially under 100° C. to counteract the tendency of temperature to fall, adding sufficient c. p. lactic acid to substantially neutralize said alkali catalyst, continuing the application of said heat and said vacuum, pouring the liquid resin into molds, and subjecting said molds to a low heat at a temperature substantially under 100° C. to harden the said resin.

9. The process of producing a low temperature phenol-formaldehyde resin resembling natural marble which comprises reacting a mass of about 1.00 part by weight of phenol and about 0.8 parts by weight of formaldehyde in the presence of a fixed alkali catalyst, heating the said phenol-formaldehyde mass without boiling the same at low heat substantially under 100° C. for a period of about 2 to about 4 hours under non-reflux conditions, applying a vacuum to the said mass whereby water is evaporated and the temperature of mass tends to fall, continuing heating said mass substantially under 100° C. to counteract the tendency of temperature to fall, adding c. p. lactic acid to substantially neutralize said alkali catalyst, continuing the application of said low heat and vacuum, pouring the liquid resin into molds, and subjecting said molds to a low heat at a temperature substantially under 100° C. to harden the said resin.

10. The process of producing a low temperature phenol-formaldehyde resin resembling natural marble which comprises reacting about 1.00 part by weight of U. S. P. phenol with about 2.0 parts of 40% to about 2.5 parts of 30% by weight of U. S. P. aqueous formaldehyde in the presence of about 0.033 to about 0.035 parts by weight of caustic soda, heating said mass without boiling the same at a temperature of about 60° C. to about 80° C. for a period of about 2 to about 4 hours under non-reflux conditions to form a resinous mass, adding about 0.068 parts by weight to about 0.075 parts by weight of lactic acid, applying a vacuum and said heat to effect the evaporation of water, the temperature of the mass tending to fall to a temperature of about 35° C. to about 40° C., continuing the application of said heat and said vacuum, pouring the mass into molds, and subjecting the resinous mass in said molds to a low heat of a temperature of about 76° C. to about 82° C. up to about 200 hours to harden said resinous mass.

11. The process of producing a low temperature phenol-formaldehyde resin resembling natural marble which comprises reacting phenol with formaldehyde in the presence of a fixed alkali hydroxide to form a resinous mass, heating said mass without boiling the same at a temperature substantially under 100° C. under non-reflux conditions, applying a vacuum to effect the evaporation of water, the temperature of the mass tending to fall, continuing the application of heat to raise the temperature of said mass to a temperature substantially under 100° C., adding c. p. lactic acid to substantially neutralize said alkali catalyst, and continuing the application of said heat substantially below 100° C. and said vacuum to effect dehydration of the liquid resinous mass.

12. A solid low temperature phenol-formaldehyde synthetic resin resembling natural marble and made by reacting phenol and a substance yielding formaldehyde in the proportion of about 1.00 part by weight of phenol to about 0.80 parts by weight of formaldehyde in the presence of a fixed alkali catalyst, heating the said phenol-formaldehyde mass at a low heat substantially under 100° C. for a period of about 2 to about 4 hours to form a resinous mass, applying a vacuum to said resinous mass whereby water is evaporated and the temperature of the resinous mass tends to fall, continuing heating said resinous mass substantially under 100° C. to counteract the tendency of the temperature to fall, adding lactic acid to substantially neutralize the alkali catalyst, continuing the application of said vacuum and said heat, pouring said mass into molds, and subjecting said molds to a low heat at a temperature substantially under about 100° C. for a period up to 200 hours to harden said resinous mass.

13. A solid low temperature synthetic resin resembling natural marble and made by reacting phenol with formaldehyde in the presence of a fixed alkali hydroxide, heating said mass without boiling the same at a temperature substantially under 100° C. under non-reflux conditions to form a resinous mass, applying a vacuum to effect the evaporation of water, the temperature of the mass tending to fall, continuing the application of heat to raise the temperature of said mass to a temperature substantially under 100° C., adding sufficient lactic acid to substantially neutralize said alkali catalyst, continuing the application of said heat substantially below 100° C. and said vacuum to effect dehydration of the resinous mass, pouring the resinous mass into molds and subjecting said molds to heat at a temperature substantially below 100° C. to harden and solidify the said resinous mass.

14. A solid low temperature synthetic resin resembling natural marble and made by reacting phenol and a substance yielding formaldehyde in the proportion of about 1.00 part by weight of phenol to about 0.80 parts by weight of formaldehyde in the presence of a fixed alkali catalyst, heating the said phenol-formaldehyde mass without boiling the same at a low heat substantially under 100° C. under non-reflux conditions to form a resinous mass, applying a vacuum to said resinous mass whereby water is evaporated and the temperature of the resinous mass tends to fall, continuing heating said resinous mass substantially under 100° C. to counteract the tendency of the temperature to fall, adding c. p. lactic acid to substantially neutralize the alkali catalyst, continuing the application of said heat and said vacuum, pouring said resinous mass into molds, and subjecting the mass in said molds to a low heat at a temperature substantially under about 100° C. to harden said resinous mass.

15. A solid low temperature synthetic resin resembling natural marble and made by reacting a mass of phenol and a substance yielding formaldehyde in the presence of a fixed alkali catalyst, heating the said phenol-formaldehyde mass without boiling the same at a low heat substantially under 100° C. for a period of about 2 to about 4 hours under non-reflux conditions, applying a vacuum to the said mass whereby water is evaporated and the temperature of mass tends to fall, continuing heating said mass substantially under 100° C. to counteract the tendency of temperature to fall, adding sufficient c. p. lactic acid to substantially neutralize said alkali catalyst, continuing the application of said heat and said vacuum, pouring the liquid resin into molds, and subjecting said molds to a low heat at a temperature substantially under 100° C. to harden the said resin.

16. A solid low temperature synthetic resin resembling natural marble and made by reacting about 1.00 part by weight of U. S. P. phenol with about 2.0 parts of 40% to about 2.5 parts of 30% by weight of U. S. P. aqueous formaldehyde in the presence of about 0.033 to about 0.035 parts by weight of c. p. caustic soda, heating said mass without boiling the same at a temperature of about 60° C. to about 80° C. for a period of about 2 to about 4 hours under non-reflux conditions to form a resinous mass, adding about 0.068 parts by weight to about 0.075 parts by weight of c. p. lactic acid, applying a vacuum and said heat to effect the evaporation of water, the temperature of the mass tending to fall to a temperature of about 35° C. to about 40° C., continuing the application of heat to raise the temperature of said mass to a temperature of about 60° C. to about 80° C. and until a sample of the resinous mass when dropped into cold water congeals to a globule having just sufficient hardness to yield slightly when squeezed between the fingers, pouring the resinous mass into molds, and subjecting the resinous mass in said molds to a low heat of a temperature of about 76° C. to about 82° C. for a period up to about 200 hours to harden said resinous mass.

17. A solid low temperature phenol-formaldehyde synthetic resin resembling natural marble and produced by the process set forth in claim 5 and having the following properties: specific gravity, approximately 1.250 to 1.380; tensile strength, approximately 6000 to 10000 lbs. per sq. in.; compression strength approximately 10000 to 16000 lbs. per sq. in.

18. A low temperature phenol-formaldehyde synthetic resin resembling natural marble and produced by the process set forth in claim 6 having a pH value of about 6.00 in its liquid state.

19. A solid low temperature phenol-formaldehyde synthetic resin resembling natural marble and produced by the process set forth in claim 10, said synthetic resin being relatively non-brittle and being capable of producing a relatively long, practically unbroken ribbon or shaving when turned on a lathe.

20. A solid low temperature phenol-formaldehyde synthetic resin resembling natural marble and produced by the process set forth in claim 10, said synthetic resin being relatively tough, strong and elastic and being capable of bending quite readily when submerged in hot water in the form of a small rod.

As testimony whereof, I hereunto set my hand.

OSKAR PANTKE.